United States Patent
Albrecht et al.

(10) Patent No.: US 12,395,050 B2
(45) Date of Patent: Aug. 19, 2025

(54) METHOD FOR MANUFACTURING A ROTOR FOR AN ELECTRICAL MACHINE WITH AN AXIAL FIXING OF A LAMINATED CORE BY MEANS OF FRICTION WELDING, AS WELL AS A ROTOR

(71) Applicant: Mercedes-Benz Group AG, Stuttgart (DE)

(72) Inventors: Thomas Albrecht, Memmingerberg (DE); Kai Beutling, Ludwigsburg (DE); Cornelius Hentrich, Waiblingen (DE); Ulrich Schweizer, Wangen (DE); Rainer Sigle, Leutenbach (DE); Andreas Wanke, Schorndorf (DE); Felix Zehren, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 208 days.

(21) Appl. No.: 18/044,290

(22) PCT Filed: Sep. 7, 2021

(86) PCT No.: PCT/EP2021/074537
§ 371 (c)(1),
(2) Date: Mar. 7, 2023

(87) PCT Pub. No.: WO2022/053443
PCT Pub. Date: Mar. 17, 2022

(65) Prior Publication Data
US 2023/0336059 A1    Oct. 19, 2023

(30) Foreign Application Priority Data
Sep. 10, 2020   (DE) .................... 10 2020 005 530.3

(51) Int. Cl.
*H02K 15/0278*   (2025.01)
*H02K 1/28*   (2006.01)
(Continued)

(52) U.S. Cl.
CPC ........... *H02K 15/0278* (2025.01); *H02K 1/28* (2013.01); *H02K 15/02* (2013.01); *B23K 20/129* (2013.01)

(58) Field of Classification Search
CPC ...... H02K 15/0278; H02K 1/28; H02K 15/02; H02K 7/003; B23K 20/12; B23K 20/129; Y10T 29/49012; Y10T 29/49126
See application file for complete search history.

(56) References Cited

U.S. PATENT DOCUMENTS

| | | | |
|---|---|---|---|
| 10,027,207 B2* | 7/2018 | Fubuki | H02K 1/28 |
| 2012/0121397 A1* | 5/2012 | Albuzat | B23K 20/12 |
| | | | 228/114.5 |

FOREIGN PATENT DOCUMENTS

| | | |
|---|---|---|
| DE | 10 2007 032 131 A1 | 1/2009 |
| DE | 10 2013 226 388 A1 | 6/2015 |

(Continued)

OTHER PUBLICATIONS

PCT/EP2021/074537, International Search Report dated Dec. 10, 2021 (Two (2) pages).

(Continued)

*Primary Examiner* — Donghai D Nguyen
(74) *Attorney, Agent, or Firm* — Crowell & Moring LLP

(57) ABSTRACT

A method for manufacturing a rotor for an electrical machine having a rotor support and a laminated core includes positioning the laminated core on a first component of the rotor support, where the laminated core at least partially radially encloses the first component relative to an axis of rotation of the electrical machine. The method further (Continued)

includes welding an axial end face of the first component of the rotor support with a second component of the rotor support to form the rotor support by friction welding, where the laminated core is fixed on the rotor support by fastening elements which respectively enclose the laminated core on both sides of the laminated core in an axial direction. At least one of the fastening elements is formed by a weld bead.

5 Claims, 4 Drawing Sheets

(51) Int. Cl.
  *H02K 15/02* (2006.01)
  *B23K 20/12* (2006.01)

(56) References Cited

FOREIGN PATENT DOCUMENTS

| | | |
|---|---|---|
| DE | 10 2016 009 249 A1 | 2/2017 |
| EP | 0 786 854 B1 | 7/1997 |
| EP | 2 069 180 B1 | 6/2009 |
| WO | WO-2008040781 A1 * 4/2008 | ............. B60B 35/12 |

OTHER PUBLICATIONS

German-language German Office Action issued in German application No. 10 2020 005 530.3 dated Aug. 9, 2021 (Nine (9) pages).

* cited by examiner

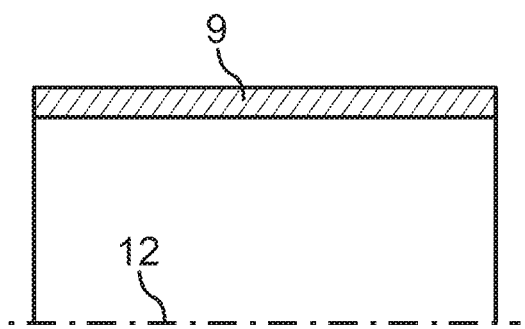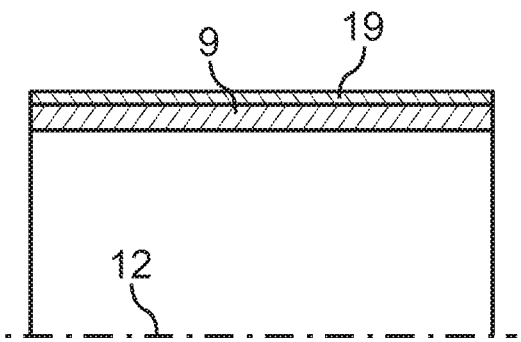
Fig.6A Fig.6B
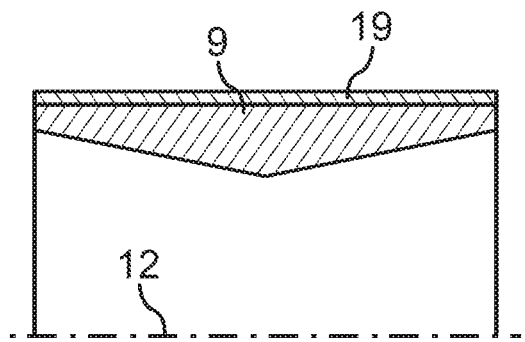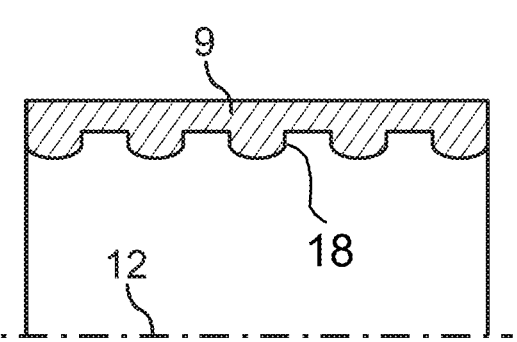
Fig.6C Fig.6D

METHOD FOR MANUFACTURING A ROTOR FOR AN ELECTRICAL MACHINE WITH AN AXIAL FIXING OF A LAMINATED CORE BY MEANS OF FRICTION WELDING, AS WELL AS A ROTOR

BACKGROUND AND SUMMARY OF THE INVENTION

A first aspect of the invention relates to a method for manufacturing a rotor for an electrical machine with a rotor support and a laminated core. A second aspect of the invention relates to a rotor, which was manufactured according to such a method. Additionally, the present application also relates to a rotor for an electrical machine with a rotor support and a laminated core, which at least partially radially encloses the rotor support relative to an axis of rotation of the electrical machine.

It is known from DE 10 2007 032 131 A1 to assemble a rotor support for an electrical machine from at least two parts, by means of friction welding. A simplified production of the rotor support from several individual parts, if necessary made of different materials, is thereby made possible.

It is the object of the present invention to further simplify the manufacture of a rotor for an electrical machine and thus to reduce the manufacturing costs.

A first aspect of the invention relates to a method for manufacturing a rotor for an electrical machine with a rotor support and a laminated core, with the steps:

positioning the laminated core at least on a first component of the rotor support, wherein the laminated core at least partially radially encloses the first component relative to an axis of rotation of the electrical machine, and welding a respective axial end face of the first component and of a second component of the rotor support to form the rotor support by friction welding, wherein the laminated core is fixed on the rotor support by respective fastening elements which enclose the laminated core on both sides in the axial direction, by reducing the size of an axial extension of the first and/or of the second component relative to the axis of rotation. Ort In other words, the laminated core is already aligned relative to the first component before the assembly of the first component and of the second component to form the rotor support. The laminated core can thereby in particular already occupy its end position relative to the first component. That position that the laminated core will also occupy later to the first component, after the welding of the first and of the second component to the rotor support, is thereby referred to as the end position. In a further embodiment, it can also be provided that the laminated core is partially positioned on the first component and partially on the second component of the rotor support. In other words, the laminated core is then partially arranged as a first part on the first component and as a second component on the second component. The respective part of the laminated core then at least partially radially encloses the respective component. During the welding of the respective end faces of the first and of the second component, the laminated core is then also indirectly assembled. In other words, the first part of the laminated core and the second part of the laminated core are then assembled in an advantageous manner by means of the connection of the first component and of the second component by means of the welding. Optionally, the laminated core can be fixed to the first component after positioning, in order to avoid slipping before or during welding. This fixing is in particular removable. This fixing can thus be removed again after the welding. For example, the fixing occurs by means of clamping jaws or similar.

When welding the respective axial end face of the first component and of the second component by means of friction welding, the first component and the second component are rotated relative to each other. The first component or the second component can thereby be rotated, while the other component remains unmoved. Alternatively, a contrary rotation of the first component and of the second component can be provided. By means of the friction between the components, heat is created. In particular, the respective end faces of the components rub against each other. Frictional heat can thus be generated on the respective component, in particular the respective end face. By means of the frictional heat and the heating of the respective component, the respective material of the first and of the second component becomes soft and/or malleable. An assembly or welding together of the respective components is thereby enabled. In particular, the respective material of the first component and of the second component, in particular in the region of the respective end faces, is a metal material. Here, the respective metal material or the respective material in general of the first and of the second component can be different. Friction welding is in particular an advantageous method for assembling different, in particular metal, materials. For example, the respective materials of the first and of the second component are different types of steel. The first component can thus be formed from a different steel or a different alloy to the second component. In a further embodiment, the first component and/or the second component can be assembled from respective component blanks. In this case, a combination of different component blanks, that are formed from different materials, is also conceivable.

Manufacturing-related tolerances in the range of several millimeters frequently occur for a laminated core for an electrical machine or in the present case, for a laminated rotor core. In other words, the extension of the laminated core in the axial direction can vary by several millimeters. This must be taken into account when fixing such a laminated core on the rotor support. The present method enables an especially simple fixing of the laminated core onto the rotor support in the radial direction, since the axial extension of the rotor support is adapted to the axial extension of the laminated core by means of friction welding. In other words, the rotor support is adapted in its axial expansion to the laminated core, which is already positioned at least on the first component during the welding, by reducing the size of the axial extension of the first and/or second component during friction welding. For example, it is provided that the respective fastening elements enclose the laminated core on both sides and thereby exert a joint force on the laminated core, wherein the respective force, which is exerted by means of the fastening elements, runs at least substantially in the axial direction and the forces are contrary to one another. In other words, during the enclosing process, a force can be exerted on the laminated core by means of each of the fastening elements, which force, in the axial direction, is directed at least substantially in the direction of the respective other fastening element. The laminated core is thus clamped between the fastening elements by means of the respective force of the latter.

Different embodiments are conceivable for the fastening elements, which are explained in more detail in the following, using respective developments.

According to a development it is provided that at least a first of the fastening elements is arranged on the first component before the welding of the first and of the second component. For example, the first fastening element is arranged on the first component by means of force fit and/or form fit and/or frictional fit, before the first and the second component are welded. In an advantageous manner, the arrangement of the first fastening element on the first component also occurs before the positioning of the laminated core on the first component. In this case, the first fastening element can be used as a bearing during the positioning of the laminated core on the first component. In other words, in this case, the first fastening element can be used for aligning the laminated core, in particular in the axial direction, during the positioning of the laminated core. Advantageously, a one-piece construction of the first fastening element and of the first component is also possible. In other words, the first component can be configured in such a way that it forms the first fastening element. In general, the first fastening element (as well as a second of the fastening elements) can be provided by a radial increase of the first component concerning the axis of rotation. In other words, the first (as well as the second) fastening element can, no matter if configured as one piece or separately from the first component, serve to increase the radius of the first component in the respective region.

According to a development it is provided that the first component is formed from two component blanks by means of friction welding, wherein a weld bead which forms the first fastening element is optionally formed by this friction welding. In other words, the first component can be formed by the connection of two component blanks. The connection of the two component blanks in particular occurs by means of friction welding. A welded joint or a weld bead can be formed during the assembly of the two component blanks to form the first component. This weld bead can optionally form the first fastening element. The assembly, in particular the friction welding, of the two component blanks to form the first component blank can thereby occur before or after the positioning of the laminated core on the first component. For example, it can be provided that the laminated core should initially be positioned on one of the two component blanks, and that only then should this component blank be welded or assembled with the other component blank. By means of the weld bead, the radius of the first component can be increased in regions, in particular in the region in which the two component blanks meet. In this way, the weld bead makes it possible to at least partially enclose the laminated core on both sides in the axial direction. By assembling the first component from two component blanks, the manufacture of the rotor can be further simplified. The use of respective different, in particular metal, materials is also possible. The weld bead represents an especially simple possibility of providing the first fastening element, without necessitating a further, separate component for this.

According to a development it is provided that the second component as well as a first of the two component blanks are configured as flanges and a second of the two component blanks is at least substantially configured as a hollow cylinder, wherein the second component blank is arranged in the laminated core during positioning and the first component blank as well as the second component are friction welded with opposite end faces of the second component blank. In the context of this embodiment it is provided that, during positioning, the laminated core is only arranged on a part of the first component, namely on the second component blank. The laminated core can thereby be placed on the second component blank or the second component blank can be inserted into the laminated core. The second component blank is subsequently friction welded at its opposite end faces both to the first component blank, in order to form the first component from this, and to the second component blank, in order to form the rotor support or the rotor from this. The welding of the second component with the first component blank as well as the second component can occur simultaneously. It is however preferred that the second component blank is initially friction welded with the first component blank and only then with the second component. In the context of this embodiment, it is especially advantageous if both fastening elements that enclose the laminated core on both sides in the axial direction are formed by means of a respective weld bead. One of the weld beads can thereby be formed by means of the welding of the first and of the second component blank and the other of the weld beads can be formed by means of the welding of the second component blank or of the first component with the second component. In this way, an especially simple and cost-effective production of the rotor is ensured.

According to a development it is provided that at least a second of the fastening elements, in particular as a weld bead, is formed during the welding of a first component and the second component or directly after the welding. The advantages of a weld bead as a fastening element have already been explained in detail. As has already been described, both fastening elements can be configured as respective weld beads. Because at least the second, in particular exactly the second, fastening element is formed during the welding, this is formed by friction welding. In other words, the second fastening element, in particular the weld bead, is formed during or by means of the friction welding, in order to clamp the laminated core. The clamping of the laminated core can occur especially advantageously if the first fastening element, as described above, is already arranged on the first component before the welding of the first and the second component. In this case, the movability of the laminated core in a spatial direction parallel to the axis is already limited. The laminated core is then also fixed parallel to the axis in the opposite spatial direction by means of the formation of the second fastening element. In this way, a gradual fixing of the laminated core and thus an especially exact alignment can be ensured. The formation of the weld bead as a second fastening element can also occur directly after the welding, as long as the components are still hot.

It is preferably provided that the reduction in size of the axial extension of the first and/or of the second component is achieved by means of a pressurization in the axial direction during and/or after the friction welding. The second of the fastening elements, if this is formed during or after the welding of the first and the second component, can be formed by means of the pressurization, until the fixing or the clamping of the laminated core in the axial direction is ensured. In other words, the axial extension of the first and/or of the second component can be carried out by means of pressurization until the axial extension of the rotor support formed from this is adapted to the laminated core. In particular, by reducing the size of the axial extension and/or the pressurization, material of the first and/or the second component is rearranged or deformed in such a way that the second fastening element, in particular the weld bead, is formed therefrom.

Alternatively, in particular if the first and the second component each already have a respective fastening element before welding the first and the second component, clamping the laminated core can occur by means of the pressurization. In general it can be provided that the first and the second component each already have a respective fastening element before the welding, wherein fixing the laminated core in the axial direction occurs by means of clamping the laminated core as a result of the reduction in the size of the axial extension of the first and/or of the second component. In other words, the distance between the respective fastening elements of the first and second components can thereby be reduced by reducing the size of the axial extension of the first and/or the second component. By means of this reduction of the distance, the laminated core can be clamped between the respective fastening elements. The reduction in size of the axial extension in particular occurs by means of the above-mentioned pressurization in the axial direction. In other words, the respective fastening elements of the first and second components can be moved nearer to each other by means of pressurization during welding by means of shortening the axial extension of the first and/second component. Due to the pressurization in the axial direction, a pressure on the laminated core is in particular created by means of the respective fastening elements. In other words, the above-mentioned opposite forces of the respective fastening elements on the laminated core can be created by means of the pressurization.

According to a development it is provided that a respective hollow space is formed between the respective fastening element and the rotor support by means of clamping the laminated core between the respective fastening elements that are already arranged on the first and the second component before the welding, wherein the hollow space comprises the welded end faces of the first component and of the second component. In other words, the respective fastening elements are each pressed against the laminated core. The hollow space between the respective fastening element and the rotor support, optionally also the laminated core, is thereby created. In other words, the respective hollow space can be defined by means of the respective fastening element, the rotor support as well as the laminated core. The hollow space or the dimensioning of the first and/or second component can thereby be selected in such a way that the hollow space comprises or seals the welded end faces of the first component and the second component, i.e., the welded joint of the first component with the second component. In this way, protection of a corrosion-sensitive welded joint can be ensured.

A second aspect of the invention relates to a rotor for an electrical machine, which was manufactured by means of a method according to the invention. In particular, the rotor is characterized by the characteristics that it has acquired by means of the manufacture with the method according to the invention.

A third aspect of the invention relates to a rotor for an electrical machine, having a rotor support and a laminated core, which at least partially radially encloses the rotor support relative to an axis of rotation of the electrical machine. It is provided according to the invention that the rotor support has respective fastening elements that enclose the laminated core on both sides in the axial direction and fix it on the rotor support in the axial direction, wherein at least one of the fastening elements is configured as a weld bead. In particular, this rotor is also manufactured for the electrical machine with a method according to the invention. In particular, the at least one weld bead is manufactured or formed by a frictional welding method. In particular, the weld bead is formed by means of the assembly or welding of a first and a second component of the rotor support.

In a further embodiment it can be provided that both fastening elements are provided by means of a respective weld bead. For example, it is provided that a first of the two weld beads is formed by means of assembling the first component out of two component blanks by means of friction welding. The second of the two weld beads can be formed by means of assembling the first component with the second component by means of friction welding.

The method according to the invention for manufacturing a rotor for an electrical machine as well as the rotor according to the first or the second aspect of the invention are closely related to each other. For these reasons, features, developments as well as their advantages, which are described in relation to the method according to the invention, also apply to a rotor according to the invention, and vice versa. For reasons of conciseness, the features of the method are therefore not described again in relation to the rotor.

Further advantages, features and details of the invention result from the description of preferred exemplary embodiments below, as well as by means of the drawings. The present features and feature combinations referred to in the description, as well as the features and feature combinations referred to below in the description of the figures and/or shown solely in the figures can be used not only in each specified combination but also in other combinations or alone, without leaving the scope of the invention.

BRIEF DESCRIPTION OF THE DRAWINGS

FIGS. 6A-6D illustrate different embodiments of a component blank for the rotor.

DETAILED DESCRIPTION OF THE DRAWINGS

Figure 1:
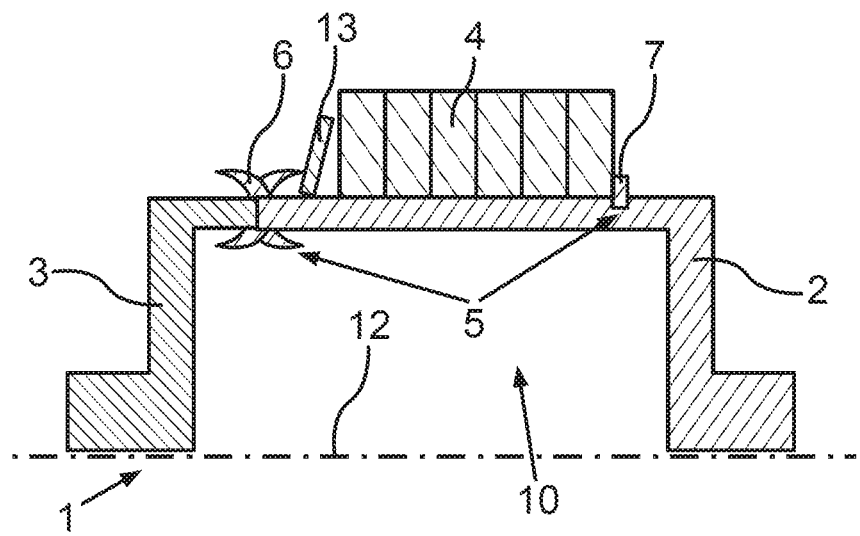
FIG. 1 is a section through a rotor for an electrical machine, which is at least assembled from two components as well as a laminated core, according to a first embodiment, in a schematic sectional view along an axis of rotation of the rotor or of the electrical machine.

FIGS. 1 to 4 show a rotor 1 and an electrical machine (not shown) according to different embodiments in a section view. The rotor 1 has an axis of rotation 12, which also in particular corresponds to an axis of rotation of the electrical machine. The respective rotor 1 has a rotor support 10, which is in turn assembled from two components 2, 3, as well as a laminated core 4. According to the embodiment, a first component 2 can in turn be assembled from two component blanks 8, 9. The respective rotor 1 is constructed rotationally symmetrically relative to the axis of rotation 12. In other words, in the respective sectional drawings of FIGS. 1 to 4, only the one respective part is shown that is above the axis of rotation 12 in the sectional view.

In the exemplary embodiment according to FIG. 1, the rotor support 10 is assembled from the two components 2 and 3. When manufacturing the rotor 1 it is in particular provided that the laminated core 4 is positioned on the first component 2 of the rotor support 10 in such a way that the laminated core 4 at least partially radially encloses the first component 2 relative to the axis of rotation 12. In other words, the first component 2 can be inserted into the laminated core 4, thereby it is in particular provided that the interior diameter of the laminated core 4 corresponds to the exterior diameter of the first component 2, excluding a component tolerance. The component tolerance can thereby be adapted to respectively achievable tolerances in the production of the laminated core 4 and/or of the first component 2. In yet other words, it can be provided that the laminated core 4 is pushed over the first component 2 during positioning. During the positioning of the laminated core 4, this can be positioned at a first of two fastening elements 5. In particular, the laminated core 4 is positioned in such a way that it touches the corresponding fastening element 5. In the present example, the first fastening element 5 is provided by a fastening element 7 that is arranged fixedly on the second component 2. Such a fastening element 7 is, for example, a clamping bracket, a snap ring or a central nut. The fastening element 7 can provide a stop for positioning the laminated core 4. Optionally, a spring element can be provided between the laminated core 4 and the fastening element 7. In the example according to FIG. 1 this is not the case. Such a spring element can, for example, be modelled on or correspond to the spring element 13.

After positioning the laminated core 4 relative to the first component 2, welding the first component 2 and the second component 3 to the rotor support 10 occurs. The welding occurs in particular by means of friction welding or by means of a friction welding process. A welded joint running in the peripheral direction relative to the axis of rotation 12 thereby arises. Herein, the welded joint forms a weld bead 6, which has an increased radius relative to the axis of rotation 12 in comparison to the first component 2 and to the second component 3. The weld bead 6 forms the second of the fastening elements 5. The spring element 13, for example a disc spring, can optionally be arranged between the weld bead 6 and the laminated core 4. Both fastening elements 5 jointly enclose the laminated core 4 on both sides or from both sides in the present example of the weld bead 6 and the pre-fastened fastening element 7. In other words, the laminated core 4 is surrounded or enclosed by the fastening elements 5. Together, the fastening elements 5 can exert a holding force on the laminated core 4. In the present example, this holding force is controlled by means of the spring element 13.

During the friction welding, the two components 2, 3 are pressed together or compressed with a predetermined force. In other words, an axial force is exerted on the components 2, 3 during the friction welding. The components 2, 3 can be pressed together by means of the axial force. The extension of at least one of the two components 2, 3 can be reduced in the axial direction relative to the axis of rotation 12 by means of the force and the friction welding. In other words, the axial extension of at least one of the two components 2, 3 is reduced during the friction welding. Figuratively speaking, material of at least one of the two components is deformed or moved by means of the effect of heat and pressure during friction welding in such a way that the weld bead 6 is formed from it. For example, the two components 2, 3 can be formed out of the same, in particular metal, substance or material. In this case, the weld bead 6 can in particular be formed by reducing the size of the axial extension of both components 2, 3. Alternatively it can be provided that both components 2, 3 are formed from different material. In this case it can be provided that the weld bead 6 is formed from the material of only one of the two components 2, 3. However, in this case a formation of the weld bead from the different materials of both components 2, 3 can alternatively also be provided.

For example, a last part of the reduction in size of the axial extension of the components 2, 3 for forming the weld bead 6 can thereby occur when the material is still hot from the friction welding but the components 2, 3 are no longer rotating, so that the weld bead 6 itself is no longer warped or is no longer against the laminated core 4 as fastening elements 5 in a rotational movement of the friction welding.

The length of the rotor support 10 can be adapted to the axial extension of the laminated core 4 during the welding of both components 2, 3 by means of the reduction of the axial extension of the first component 2 and/or of the second component 3. This is advantageous, since laminated cores 4 typically have similarly large tolerances regarding their axial extension. This makes a complicated fastening of the laminated core 4 in the axial direction necessary in manufacturing according to the prior art. By means of forming the weld bead 6 during the welding, this is automatically adapted to the axial extension of the laminated core 4. In other words, the weld bead 6 is formed regarding its position and/or form in such a way that it optimally encloses the laminated core 4 in the function of the second fastening element 5 of the corresponding side. In the present example according to FIG. 1, the laminated core 4 touches the previously arranged fastening element 7 during the welding, which serves as a stop. The laminated core 4 can also additionally be provisionally fixed on the first component 2 for this purpose, in order to avoid slipping during the welding. During the welding, the weld bead 6 forms on the side of the laminated core 4 facing away from the fastening element 7 serving as a stop, by means of which weld bead the laminated core 4 is enclosed. By means of the formation of the weld bead 6, the laminated core 4 is in particular clamped between the weld bead 6 and the pre-fastened fastening element 7. In this way, the axial fixing of the laminated core 4 is ensured.

Figure 2:
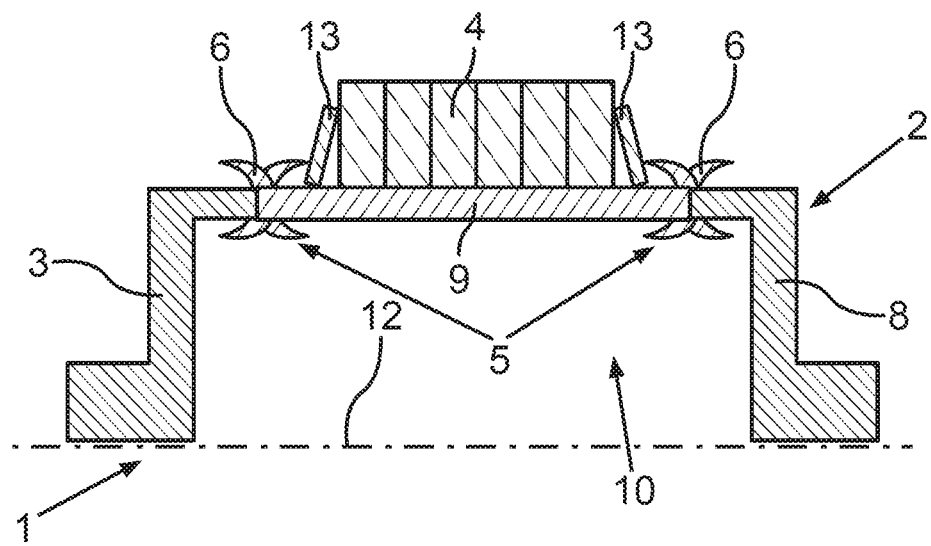
FIG. 2 illustrates a second embodiment of such a rotor, wherein one of the components is formed from two component blanks.

The exemplary embodiment of FIG. 2 differs from the exemplary embodiment according to FIG. 1 to the effect that the first component 2 is assembled from a first component blank 8 and a second component blank 9. Differences between the rotor support 10 from FIG. 2 and the rotor support 10 from FIG. 1 and the respective fundamental manufacturing method are briefly explained in the following. In the present exemplary embodiment, both fastening elements 5 are produced by means of a respective welded joint or a respective weld bead 6. In other words, the laminated core 4 is enclosed by the two weld beads 6 on both sides or is clamped between the two weld beads 6. The assembling of the first component 2 from the two component blanks 8, 9 can occur before or simultaneously with welding with the second component 3. In other words, it can be provided that the first component 2 is initially made by means of assembling the first component blank 8 and the second component blank 9, in particular by means of welding or friction welding. The laminated core can then be positioned on the first component 2. In this case, positioning the laminated core 4 on the first component 2 as well as the welding of the first component 2 and of the second component 3 in particular occurs in the same manner as has already been explained in relation to the exemplary embodiment of FIG. 1. The only difference in this case is that the previously arranged fastening element 7 is also provided by a weld bead 6. In other words, in this case the weld bead 6 that is formed by means of welding, in particular friction welding, the first component blank 8 and the second component blank 9 to form the second component 2 can serve or be used here as a stop for the positioning of the laminated core 4.

Alternatively, it can be provided in the embodiment according to FIG. 2 that the two weld beads 6 are created at the same time. In this case it is in particular provided that the first component blank 8, the second component blank 9 and the second component 3 are simultaneously welded with each other, in particular by means of friction welding. In other words, the welding of the first component blank 8 and the second component blank 9 to form the first component blank 2 occurs simultaneously with the welding of the first component 2 with the second component 3 to form the rotor support 10. In this case it can in particular be provided that the laminated core 4 is positioned relative to the second component blank 9 in such a way that the laminated core 4 at least partially encloses the second component blank 9 in a radial direction. Preferably, the second component blank 9 is configured as a hollow cylinder. Alternatively, an embodiment as a hollow shaft can also be provided. Welding with the first component blank 8 or the second component 3 can then occur on both sides of the second component blank 9. In particular, the second component blank 9 is welded with the first component blank 8 on its first end face, preferably by means of friction welding, and the second component blank 9 is welded with the second component 3 on its second end face, preferably by means of friction welding. The respective weld bead 6 thus forms on both sides of the laminated core 4, in particular simultaneously, as the respective fastening element 5. The welding by means of friction welding in particular occurs under an axial application of force. In this case, a reduction in size of the axial extension of the second component 3, and/or of the first component blank 8 and/or of the second component blank 9 can thus also occur. By means of the corresponding change to the axial extension or reduction in size of the axial extension, the resulting rotor support 10 is adapted to the axial extension of the laminated core 4. The laminated core 4 is clamped between the two weld beads 6 and is thereby axially fixed. This is done in particular automatically by means of friction welding and the formation of weld beads 6 of the corresponding position and/or shape.

Figure 3:
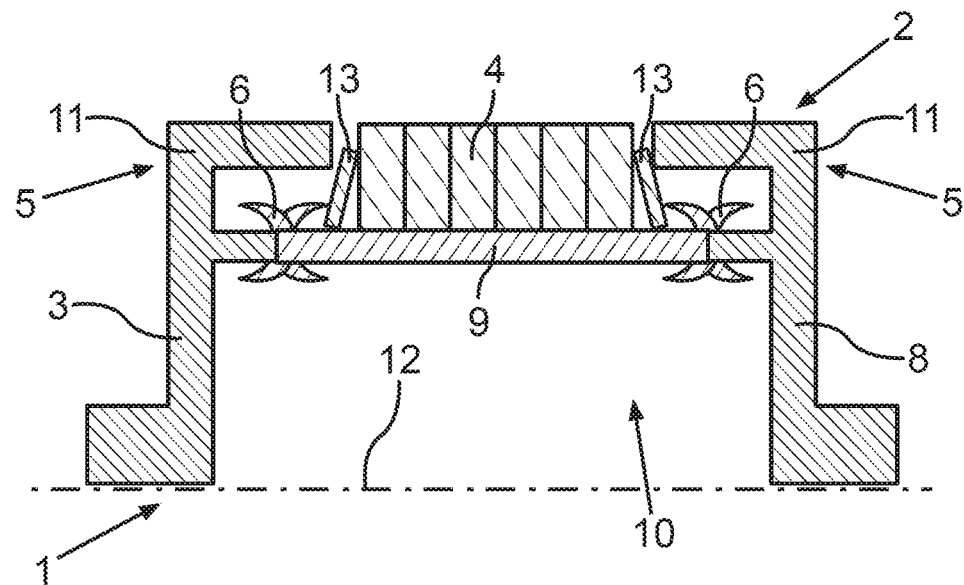
FIG. 3 illustrates an alternative embodiment of a rotor, in which fastening elements separate from welded joints are arranged on the first component and the second component.

In contrast to the embodiments according to FIGS. 1 and 2, the fastening elements 5 in the embodiment according to FIG. 3 are formed as arms 11, which are in particular aligned at least partially parallel to the axis of rotation 12 and are larger in circumference than the inner circumference of the laminated core 4. Here too, the laminated core 4 is clamped between the fastening elements 5 or is encompassed by these. The embodiment according to FIG. 3 can be manufactured analogously to the embodiment of FIG. 2, in that the first component 2 is initially formed by assembling the first component blank 8 and the second component blank 9, and the first component 2 is then welded with the second component 3. Alternatively, the first raw component 8, the second component blank 9 and the second component 3 can also be simultaneously welded with each other, also analogously to the embodiment of FIG. 2. Herein, a respective spring element 13 is arranged between a respective arm 11 and the laminated core 4. This is, however, to be understood as purely exemplary and optional.

A difference to the previous embodiments (according to FIGS. 1 and 2) is that, here, the weld bead 6 or the weld beads 6 are not formed as or do not serve as fastening elements 5. Instead, the weld beads 6 serve only to absorb excess material from the components 2, 3 or for shortening the axial extension of the components 2, 3 or of the second component 3 and the component blanks 8, 9 during friction welding. In other words, the welding or friction welding here also occurs under axial pressure. The arms 11 are each pressed against the laminated core 4 by this axial pressure, optionally with a respective spring element 13 that lies between them. By means of suitable selection of the axial pressure and the welding conditions, a predetermined contact force of the arms 11 on the laminated core 4 can thereby be produced. The axial extension of the rotor support 10 is thus adapted to the axial extension of the laminated core 4. Tolerances for the laminated core 4 can be balanced by means of adapting the rotor support 10. In this embodiment, the friction welding thus does not serve for the formation of a weld bead 6 as a fastening element 10, rather for assembling the rotor support 10 as well as adapting the axial extension of the rotor support 10.

Here too, a final part of the shortening of the axial extension can occur shortly after the friction welding, so that the material of the friction welding point is still hot and deformable, but the components 2, 3 are no longer rotating with respect to the laminated core 4, so that the arms 11 do not carry out any more rotational movement against the laminated core 4 during axial compressing.

Figure 4:
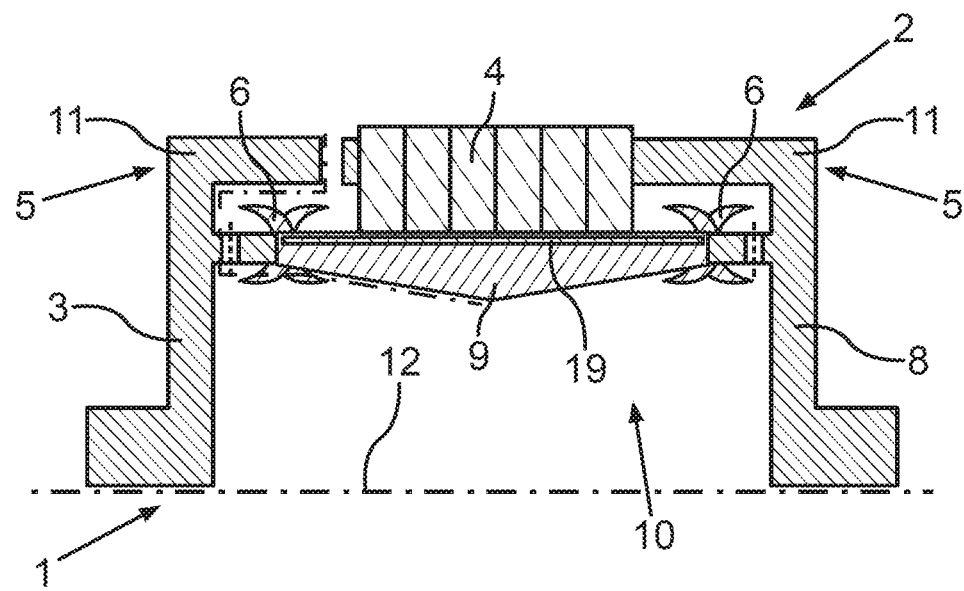
FIG. 4 illustrates an embodiment of a rotor with an oil chamber integrated into a component of the rotor.

FIG. 4 shows a further embodiment of the embodiment from FIG. 3. Here, the second component blank 9 is configured with variable wall thicknesses or an axially different inner radius. A distribution of oil on the interior side of the rotor support 10 is enabled by means of this embodiment of the second component blank 9. The weld beads 6 hereby serve as a means to limit the oil film.

Figure 5A:
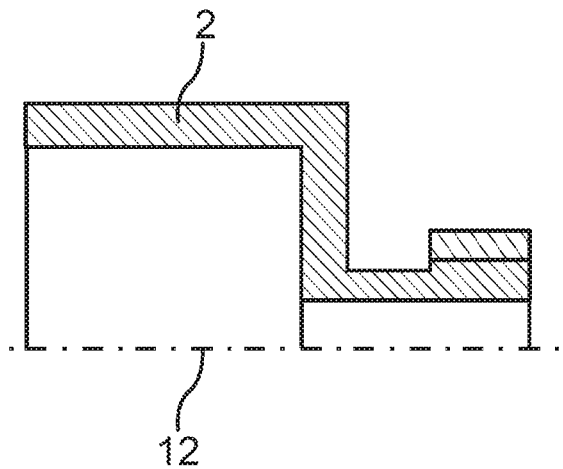
FIGS. 5A-5D illustrate different exemplary embodiments of a component for the rotor.

FIGS. 5A to 5D show different embodiments of first components 2 or first component blanks 8. An alternative embodiment of the first component 2 in the exemplary embodiment according to FIG. 1 in the manner of the first component 2 according to the exemplary embodiment from FIG. 5A is, for example, possible. In this case, a shaft coming out of the rotor 1 can be configured as a hollow shaft. In general, a combination of the rotor support 10 or the rotor 1 with an arbitrary driveshaft or output shaft is possible and explicitly provided. An embodiment of the rotor support 10 as a hollow shaft or solid shaft is also explicitly provided.

Figure 5B:
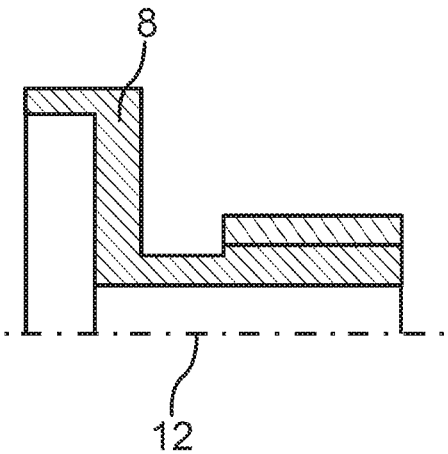
Figure 5C:
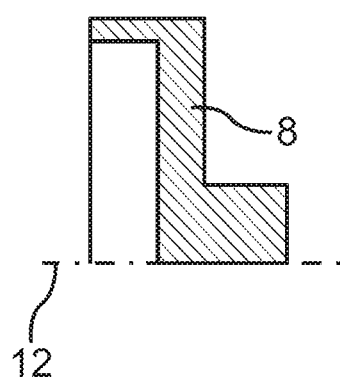
Figure 5D:
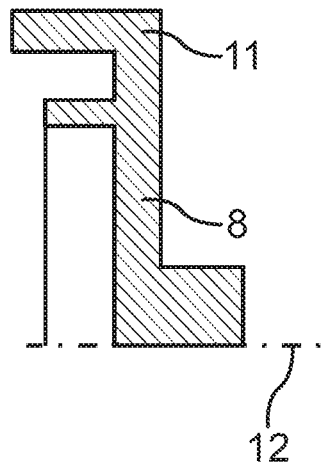

FIGS. 5B to 5D show different embodiments for the first component blank 8. It can be provided that the second component 3 and the first component blank 8 are respectively configured identically or mirror-symmetrically to each other. For example, the axis of symmetry can therefore be perpendicular to the axis of rotation 12. The second component blank 9 can thus be arranged between two identical or two mirror-symmetrical parts, namely the second component 3 and the first component blank 8. The two identical or mirror-symmetrical parts can therefore be formed as respective flanges, which enclose a hollow shaft that lies between them, namely the second component blank 9. The flange can optionally have a toothed gearing. According to FIG. 5B, an embodiment of a shaft coming out is shown as a hollow shaft. FIG. 5C shows a first component blank 8 or a second component 3 as used in an exemplary embodiment like FIG. 2. FIG. 5C shows a first component blank 8 or a second component 3 as used in the exemplary embodiments of FIGS. 3 and 4.

Finally, a respectively different embodiment of a second component blank 9 is shown in FIGS. 6A to 6D. For example, a regular hollow cylinder with smooth inner lateral areas and smooth outer lateral areas is conceivable (FIG. 6A). Alternatively, it can be provided that the outer and/or inner lateral areas are profiled. In FIG. 6B, an outer profiling 19 is implied. As has already been shown in relation to the exemplary embodiment according to FIG. 4, the wall thickness of the hollow shaft or of the hollow cylinder, through which the second component blank 9 is provided, can be variable. This is represented in FIG. 6C. Additionally, an outer profiling 19 is also implied in this embodiment. FIG. 6D shows an exemplary further contour of a profiling 18 in the manner of a screw thread. The profiling 18 is hereby, for example, arranged on the inner lateral area. An alternative or additional profiling 18 on the outer lateral area is, however, also provided. The different component blanks 9 can, for example, be a respective extrusion profile. In other words, the component blank 9 or the component blanks 9 can be formed by extrusion. Extrusion is thereby an especially convenient method for manufacturing components in large quantities.

In summary, this is an especially convenient and highly automatable possible way of producing the rotor 1. Large tolerances in the axial extension of the laminated core 4 can thus be balanced by means of shrinking the rotor support 10 during the assembly of the same from the components 2, 3 or from the component 2 and the component blanks 8, 9. For example, the balancing occurs at least partially by means of the formation of an appropriate weld bead 6 in a suitable shape or position. Alternatively or additionally, the balancing can occur because a distance between two fastening elements 5, in particular two arms 11, is shortened by means of friction welding and the associated shortening of the rotor support 10 or its individual parts.

LIST OF REFERENCE CHARACTERS

1 Rotor
2 First component
3 Second component
4 Laminated core
5 Fastening element
6 Weld bead
7 Fastening element
8 First component blank
9 Second component blank
10 Rotor support
11 Arm
12 Axis of rotation
13 Spring element
14 Hollow space
18 Profiling
19 Profiling

The invention claimed is:

1. A method for manufacturing a rotor (1) for an electrical machine having a rotor support (10) and a laminated core (4), comprising the steps of:
    positioning the laminated core (4) on a first component (2) of the rotor support (10), wherein the laminated core (4) at least partially radially encloses the first component (2) relative to an axis of rotation (12) of the electrical machine; and
    welding an axial end face of the first component (2) of the rotor support (10) with a second component (3) of the rotor support (10) to form the rotor support (10) by friction welding such that a welded joint running in a peripheral direction relative to the axis of rotation (12) arises wherein the welded joint forms a first weld bead (6), wherein the laminated core (4) is fixed on the rotor support (10) by a first fastening element (5) and a second fastening element (7) which respectively enclose the laminated core (4) on both sides of the laminated core (4) in an axial direction, by reducing a size of an axial extension of the first component (2) and/or of the second component (3) relative to the axis of rotation (12);
    wherein the first fastening element (5) is formed by the first weld bead (6).

2. The method according to claim 1, wherein the second fastening element (7) is arranged on the first component (2) before the welding.

3. The method according to claim 1, wherein the first component (2) is formed from a first component blank (8) and a second component blank (9) by friction welding which forms a second weld bead (6) and wherein the second fastening element (7) is formed by the second weld bead (6).

4. The method according to claim 3, wherein the second component (3) and the first component blank (8) are configured as flanges and the second component blank (9) is configured as a hollow cylinder and wherein the second component blank (9) is arranged on the laminated core (4) during the positioning and the first component blank (8) and the second component (3) are friction welded with opposite end faces of the second component blank (9).

5. The method according to claim 1, wherein the reducing is achieved by a pressurization in the axial direction.

\* \* \* \* \*